United States Patent
Engelberg et al.

(10) Patent No.: US 7,295,123 B2
(45) Date of Patent: Nov. 13, 2007

(54) METHOD FOR DETECTING A PERSON IN A SPACE

(75) Inventors: Thomas Engelberg, Hildesheim (DE);
Steffen Abraham, Hildesheim (DE);
Heiko Freienstein, Hildesheim (DE);
Hoang Trinh, Hildesheim (DE);
Hans-Dieter Bothe, Seelze (DE)

(73) Assignee: Robert Bosch GmbH, Stuttgart (DE)

( * ) Notice: Subject to any disclaimer, the term of this patent is extended or adjusted under 35 U.S.C. 154(b) by 369 days.

(21) Appl. No.: 10/517,746

(22) PCT Filed: Feb. 14, 2003

(86) PCT No.: PCT/DE03/00452

§ 371 (c)(1),
(2), (4) Date: Dec. 9, 2004

(87) PCT Pub. No.: WO03/107259

PCT Pub. Date: Dec. 24, 2003

(65) Prior Publication Data

US 2006/0062472 A1    Mar. 23, 2006

(30) Foreign Application Priority Data

Jun. 13, 2002    (DE) ............... 102 26 257

(51) Int. Cl.
*G08B 23/00*   (2006.01)
(52) U.S. Cl. ............... 340/576; 340/575; 340/573.1
(58) Field of Classification Search ............... 340/575, 340/576, 545.1, 545.2, 573.1; 382/117, 118, 382/104, 106; 701/45, 46, 49; 348/143, 348/148

See application file for complete search history.

(56) References Cited

U.S. PATENT DOCUMENTS

| | | | | |
|---|---|---|---|---|
| 6,252,978 B1 * | 6/2001 | Grantz | ............... | 382/118 |
| 6,324,453 B1 * | 11/2001 | Breed et al. | ............... | 701/45 |
| 6,717,518 B1 * | 4/2004 | Pirim et al. | ............... | 340/576 |
| 6,748,308 B2 * | 6/2004 | Losey | ............... | 701/49 |

FOREIGN PATENT DOCUMENTS

| | | |
|---|---|---|
| DE | 198 14 691 | 3/1999 |
| WO | WO 99/53443 | 10/1999 |

OTHER PUBLICATIONS

K. Rohr, "Incremental Recognition of Pedestrians from Image Sequences" Computer Vision and Pattern Recognition, 1993, Proceedings CVPR '93, 1993 IEEE Computer Society Conference on New York, NY USA Jun. 15-17, 1993, Los Alamitos, CA, pp. 8-13 XP010095873, ISBN: 0-8186-3880-X.

D. Marr & H. Nishihara, "Representation and Recognition of the Spatial Organization of Three-Dimensional Shapes" Proc. Royal Soc. London, vol. 200, 1978, pp. 269-294, XP008018438.

S. Park, "Optische Kfz-Innenüberwachung" Elektronisch Verfübare Dissertationen und Habilitationsschriften an der Universitätsbibliothek Duisburg, Online, Oct. 17, 2000, pp. 1-170, XP002244749.

* cited by examiner

*Primary Examiner*—Van T. Trieu
(74) *Attorney, Agent, or Firm*—Kenyon & Kenyon LLP

(57) ABSTRACT

A method for detecting a person in a space includes at least one depth sensor producing spatial data about the space to be monitored, at least one sub-model, which is sub-dividable into further sub-models being used for at least one selected body part of a human, the spatial data being used to adapt the sub-models, the adaptation being checked by position parameters between the sub-models of different body parts, and the person being recognized using a complete model made up of the checked sub-models.

10 Claims, 6 Drawing Sheets

METHOD FOR DETECTING A PERSON IN A SPACE

CROSS-REFERENCE TO RELATED APPLICATIONS

This application is claimed the benefit under Title 35, U.S. Code § 120 of a PCT International Application No. PCT/DE 03/00452 filed on Feb. 14, 2003, and the benefits under 35 U.S.C. 119(a)-(d), European Patent Application number 102 26257.8 filed on Jun. 13, 2002.

FIELD OF THE INVENTION

The present invention is directed to a method for detecting a person in a space.

BACKGROUND INFORMATION

The method according to the present invention for detecting a person in a space may have the advantage of being a compromise between complexity and simplicity: Complex situations, such as persons in unusual poses, with unusual clothes, or persons that are partially concealed, are processed with little effort. In this connection, it should be noted that the "detection of a person" is understood to also include the detection of specific body parts.

During the search, the presented method concentrates on comparatively few body parts that can be detected in a reliable and fast manner, such as the head. If the head of an occupant is in an unusual position in the motor vehicle, or if there are two occupants per seat in the motor vehicle, or if there exist partial concealments of the body, the respective heads are still found because there is no need to bring a complete human model into line with the scene.

The method provides different sub-models for a body part, the different sub-models being a function of the method in the case of different clothing and headgear.

Therefore, the method of the present invention is superior both to the model-free method and to a complex, complete CAD model because it can also cope with atypical scenarios. "Model-free" means that here the volume distribution, or other characteristics such as the curvature or texture, are directly evaluated by a classifier. A serious disadvantage of this method is that not all situations (such as the pose or clothing) can be covered in the training. This results in poor detection performance for model-free approaches.

Unlike the CAD model, the method according to the present invention is fast because only a few parameters are estimated. For a fast algorithm, rather than all measured values, it may be that only those of the volume to be examined may have to be taken into account to adapt a sub-model. The method according to the present invention has the characteristic that a hierarchical model of a human is adapted to the spatial data of a depth sensor. This depth sensor, for example, has high resolution. For example, the organization of the model and the method of adaptation to the spatial data of the depth sensor may be advantageous. In this context, the model may be a shape model (surface model) of the human body. The model may be designed to be articulatable, i.e., movable, and to be able to describe different forms of bodies and clothing.

According to an example embodiment, the complete model may be adapted to follow the person over time by further adapting the sub-models using the data at predetermined intervals. This allows a so-called "tracking"; a complete adaptation no longer being needed, but the detected body parts being trackable in space and time.

According to an example embodiment, at least one body part, such as the head, the shoulder, or also, for example, the chest of a human, is of importance for the classification of an occupant, especially in automotive applications such as restraint systems or occupant condition monitoring. Moreover, these body parts may be easy to recognize.

Moreover, it may be beneficial that intensity information from the data is used, the intensity information being texture characteristics, such as gray levels of the gray image or color values of the color image, which are each determined by an imaging sensor. These texture characteristics may then be associated with individual body parts in order to associate more detailed information with the individual body parts. This also allows consistency checking to be able to detect a person.

However, the general consistency check may be performed using the position parameters that define the relationship between the individual sub-models associated with the different body parts. This consistency check allows the adaptation of the sub-models by the measured sensor values to lead to reasonable values changes.

Moreover, the complete model may be transmitted for occupant classification to a restraint system in a vehicle in which the person is located. This then allows, for example, detection of persons; the system primarily detecting the posture of the occupant to identify a dangerous position of the occupant with respect to air bags and belt pretensioners. Thus, the so-called "out-of-position positions" are identified to prevent activation of the air bags in such positions in order to avoid injuries. The so-called "tracking" allows dynamic out-of-position sensing. Thus, the posture of the occupant is detected in real time. This may play a role in the case of fast movements of the head relative to the sensor, which are induced, for example, by vehicle decelerations during braking maneuvers or collisions. Here, it is also possible to classify the occupants based on size or biometric conditions, such as the average head radius or the shoulder width.

Another use of the method according to the present invention is the anti-pinch protection for extremities or objects in power windows. Extremity detection can also be used for gesture recognition. Monitoring the passenger compartment while the vehicle is parked may also be an application of the method according to an example embodiment of the present invention. This may be used, for example, in a car alarm system. It is also possible to automatically operate the child security door lock against accidental opening if a child has been detected by the method according to the present invention. In combination with a temperature sensor, it is possible to adjust the temperature by opening and closing the windows, or by controlling the air conditioning, in case a person or, for example, a child is alone in the vehicle. Convenience features may also benefit from an example embodiment of the method according to the present invention. The adjustment of headrests, mirrors, sun visors, steering wheel and/or contoured seats can be carried out automatically. The control of other systems that require the exact position of the head is rendered possible, inter alia, a hands-free kit, head-up displays, or noise control systems. Other methods, for example, for identifying the occupants, or eye localization are aided by a precise localization of the head, if necessary, along with an orientation measurement.

The depth sensor takes the form, for example, of an image pickup. Above all, a video sensor, such as a stereo camera system or a multi-camera system, may be used here. Also usable here are a distance-measuring matrix sensor using the transit-time principle or the phase-measuring principle, a laser scanner, a laser radar, or structured lighting. Further, the distance-measuring matrix sensor may use a microwave radar, or the measuring principle may be based on the emission of sound waves (ultrasound), or an arbitrary electromagnetic radiation (visible light, invisible light, microwaves).

Likewise, the representation of the sub-models contained in the modules can take completely different forms, such as CAD data, measurement data, triangulated data, superquadrics, or two-dimensional descriptions.

DETAILED DESCRIPTION

Systems for sensing the passenger compartment of a motor vehicle are based on very different physical measuring principles. For example, it is possible to use a weight mat here; the pressure profile being used to determine whether the seat is empty or occupied. Alternatively, it is possible to carry out a classification. However, the sensor systems relevant to the method according to the present invention are depth-measuring sensor systems. Here, the distance-measuring matrix sensor, for example, takes the form of an image pickup. Such an image pickup may be a video sensor, a radar sensor, an ultrasound sensor, or a multi-camera system. In this connection, it is possible to use different measuring principles: the transit-time principle, the phase-measuring principle, the principle of structured lighting, and the laser scanner principle.

The spatial data of the depth sensor, which generally takes the form of a matrix sensor and produces more than a hundred measured values virtually simultaneously, is used to detect a person in a space. In the case of the passenger compartment of a motor vehicle this is, for example, the occupant-presence situation. Besides the pure occupant presence, it may also be necessary to classify the occupants, i.e., size, pose, and weight. In this connection, especially the localization of individual body parts, such as the head or the chest, is of interest for the control of, for example, restraint systems. Such information is also useful for various convenience features, such as the adjustment of rearview mirrors.

Figure 1:
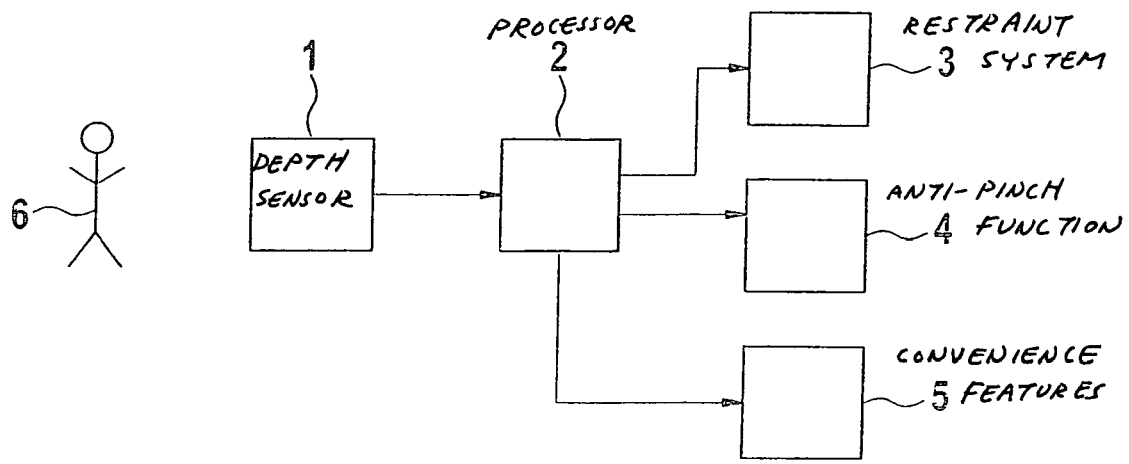
FIG. 1 shows a block diagram of an example embodiment of a device according to the present invention.

FIG. 1 shows an example embodiment of a device according to the present invention in a block diagram. A person 6 is detected by a depth sensor 1 in terms of his/her spatial extent. Depth sensor 1 is mounted, for example, in a passenger compartment to act as an image pickup. The spatial data are transmitted to a processor 2 on which the method according to the present invention is executed. A restraint system 3, an anti-pinch function 4, and convenience features 5 are controlled by processor 2 as a function of the result of the method according to the present invention. Therefore, processor 2 may be located in a control unit.

Further vehicle functions are also controllable by processor 2 so that these vehicle functions may also benefit from the inventive method for detecting a person. The method according to the present invention is applicable outside of motor vehicles, for example, for video surveillance. Access systems may also utilize the method according to the present invention.

Figure 2:
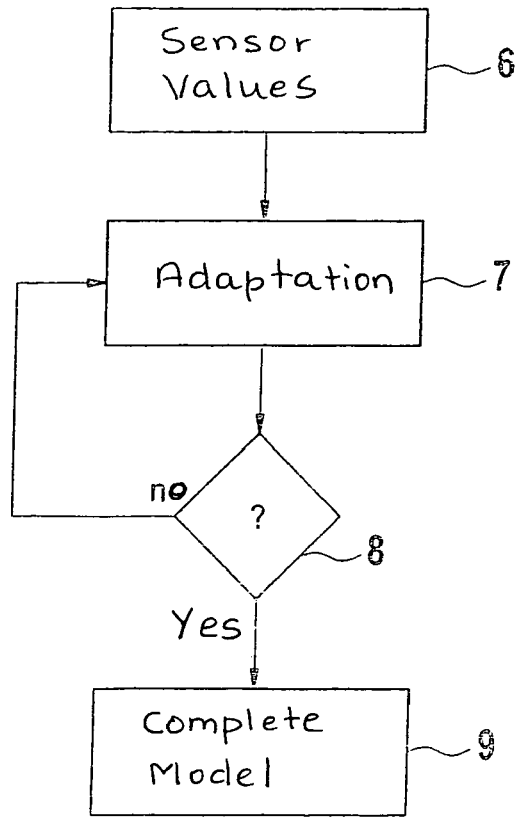
FIG. 2 is a first flow chart of an example embodiment of the method according to the present invention.

FIG. 2 shows an example embodiment of the sequence of the inventive method in a first flow chart. In method step 6, sensor 1 produces sensor values that provide spatial data about person 6. This data is transmitted to processor 2.

Processor 2 loads on its memory a model of a human which is hierarchically structured; i.e., there exist sub-models for different body parts, the sub-models in turn being divided into further sub-models. This subdivision is done to allow optimal adaptation for different typical clothing situations of the particular body. Then, processor 2 selects the appropriate sub-model at the lowest level of the sub-models, and performs an adaptation using the spatial data. For this purpose, any optimization method may be employed.

Method step 8 checks whether this adaptation is consistent with respect to the position parameters. If this not the case, then the method returns to step 7 to repeat the adaptation. However, if this is the case, then, in method step 9, the complete model is gradually assembled from the sub-models. If, in the process, certain body parts are not found, for example, because of a concealment effect, a consistent interpretation of the spatial data is still obtained. This complete model is then used to recognize the person. This data is then made available to other functions, such as the restraint system, the convenience feature, or the anti-pinch protection.

Figure 3:
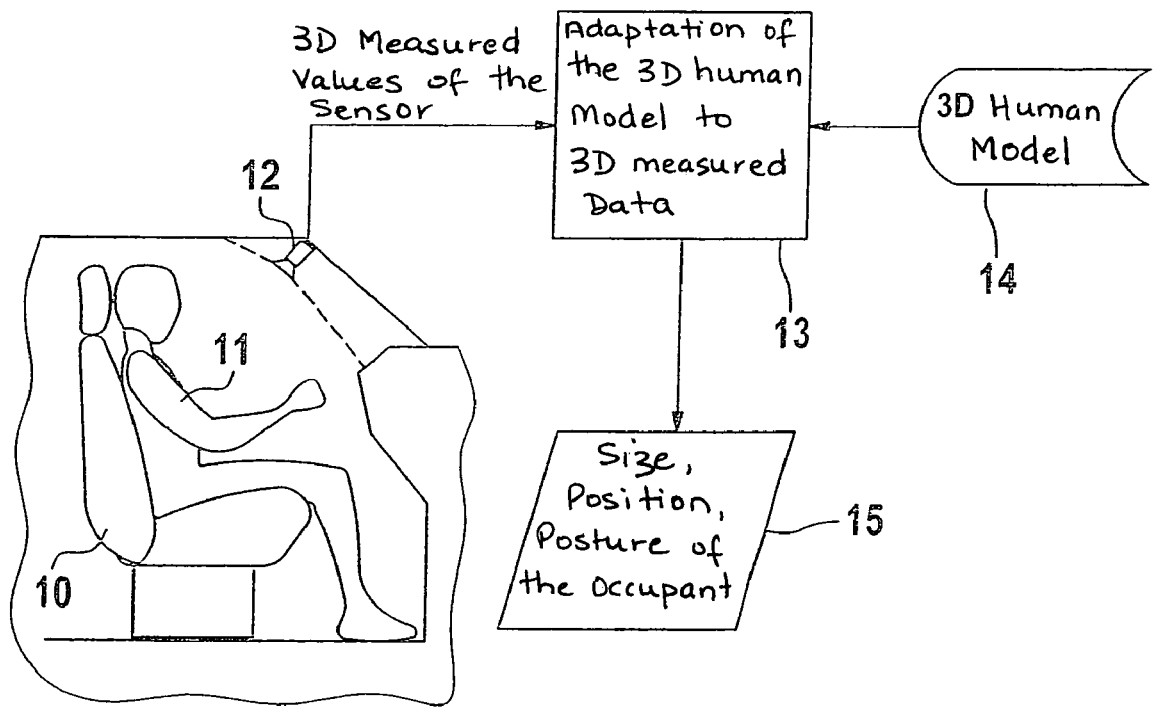
FIG. 3 shows a block diagram of an example embodiment of the method according to the present invention.

FIG. 3 shows an example embodiment of the inventive method in a block diagram. A person 11 is seated on a vehicle seat 10, and is spatially detected by a depth sensor 12. This depth sensor 12 takes the form of a video sensor here, and is located above the windshield. However, depth sensor 12 can also be installed at other locations in the passenger compartment. The spatial measured values of sensor 12 are transmitted to a processor 13 which adapts the spatial model to the spatial measured values using the sub-models. To this end, a complete model 14 is loaded from a memory. Processor 13 delivers the size, position, and posture of the occupant as an output quantity 15.

Figure 4:
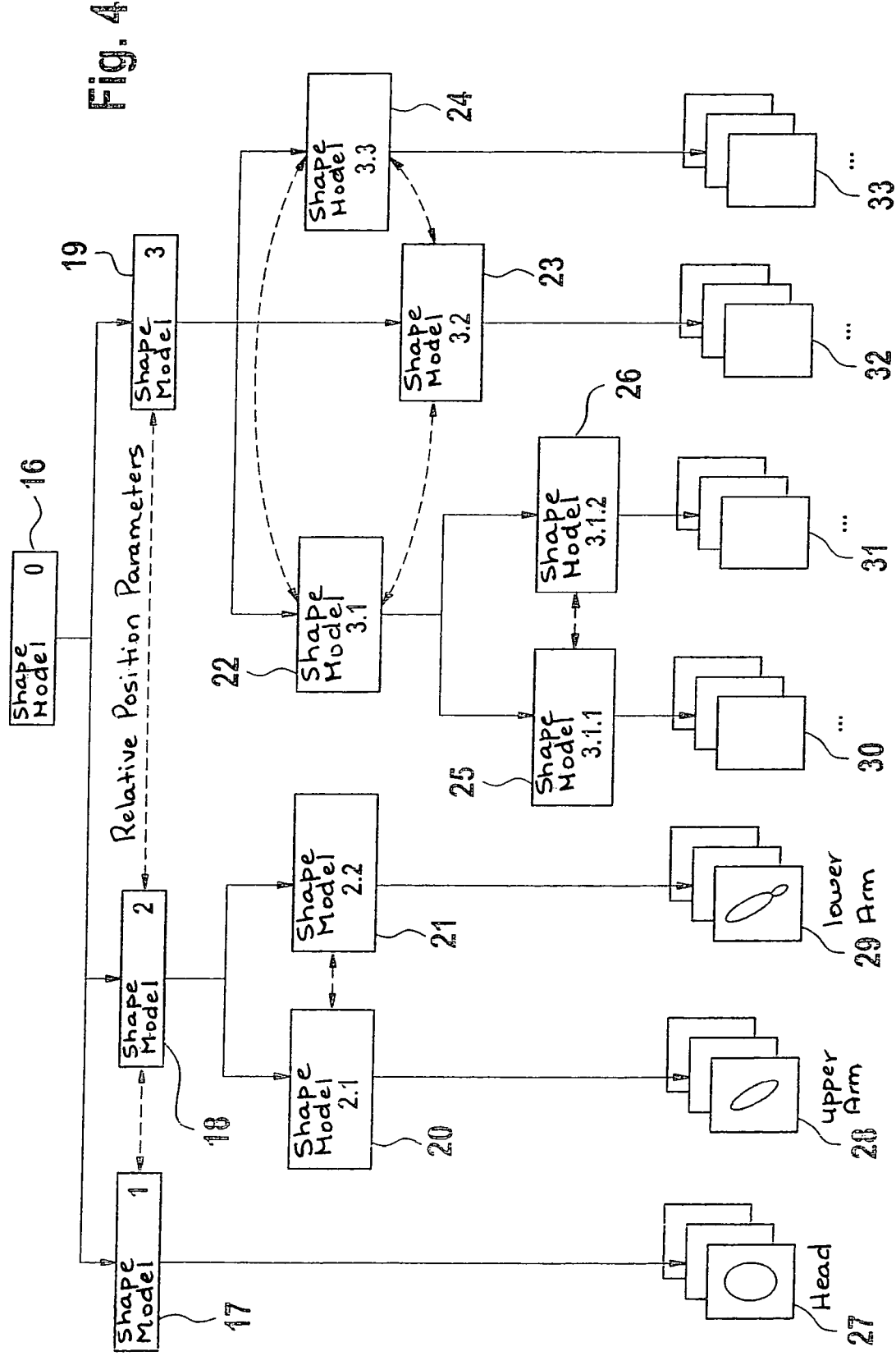
FIG. 4 is a representation of an example embodiment of the hierarchical models.

In FIG. 4, the hierarchical model is shown by way of an example embodiment. The complete model is referred to as "shape model 0 16". This model 16 is further divided into one or more units 17 through 19, which are referred to as shape model 1 through shape model 3. The permitted relationships between these sub-models, which are defined by the relative position parameters, are stored for these sub-models. Analogously to the division of shape model 0 into its sub-models, it is possible to break down these sub-models into sub-models as well, and to specify the relationships of the sub-models. The sub-models of shape model x are referred to as "shape model x.y". In this connection, y denotes a non-zero natural number. The model may contain an arbitrary number of such levels. The number of the further subdivisions and the depth of the subdivisions, i.e., the number of levels, are not predetermined and may be handled differently for different sub-models. All branches of the model have in common that they contain one or more surface models as the last level. The set of surface models describes the respective body part in different forms and depths of detail. The shape model 1.17 sub-model is composed of sub-models for head 27. Shape model 2.18 is divided into shape models 2.1.20 and 2.2.21 of which shape model 2.1 pertains to upper arm 28 while shape model 2.2 pertains to lower arm 29. Shape model 3.19 is divided into three shape models 3.1.22, 3.2.23 and 3.3.24, which are defined by the relative position parameters with respect to each other. Shape model 3.1.22 is divided into shape models 3.1.1 and 3.1.2, which are provided with reference numerals 25 and 26, respectively. Shape model 3.1.1 is divided into further sub-models 30 that define the shoulder here. Shape model 3.1.2 defines different pieces of torso information. Likewise, body parts 32 and 33 are associated with shape models 3.2.23 and 3.3.24, respectively. The number of the further subdivisions and the depth of the subdivisions, i.e., the number of levels, are not predetermined and may be handled differently for different sub-models. All branches of the model have in common that they contain one or more surface models as the last level. The set of surface models describes the respective body part in different forms and depths of detail. During the adaptation of the model to the scene, the model is processed starting from certain shape models or individual surface models. These individual parts are assembled to form the complete model, taking into account the consistency with respect to the position parameters. Once the rough position parameters have been determined, detailed surfaces may be further adapted, taking into account the consistency conditions.

If certain body parts are not detected, for example, because of concealment effects, a consistent interpretation of the spatial measured data is still obtained.

Figure 5:
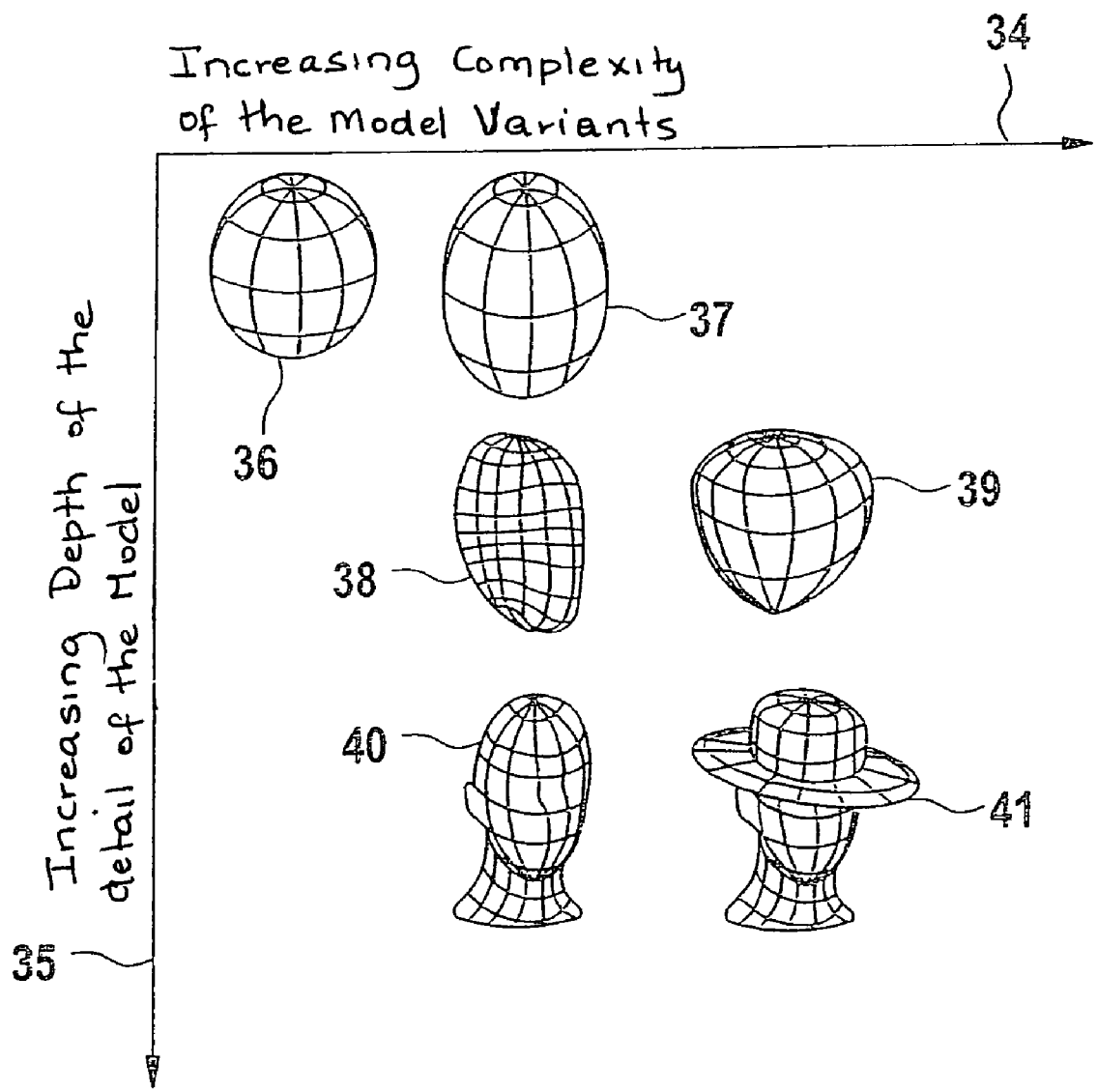
FIG. 5 shows a shape model of the head in different variations and depths of detail, according to an example embodiment of the present invention.

An exemplary set of surface models of the head, according to an example embodiment, is shown in FIG. 5. The complexity of the model variants increases on abscissa 34. An increasing depth of detail of the model is described on ordinate 35. The simplest model 36 becomes the more complex sub-model 37, which is sub-divided into a more detailed model 38 and an even more detailed model 40; the more detailed model 40 already representing the head shape fairly accurately. For model 38, there exist model 39 which has the same depth of detail, but greater complexity. Selecting a greater depth of detail for model 39 leads to model 41, which shows a head with a hat that has a brim. Sub-models 40 and 41 are ultimately used for adaptation to the spatial data.

Figure 6:
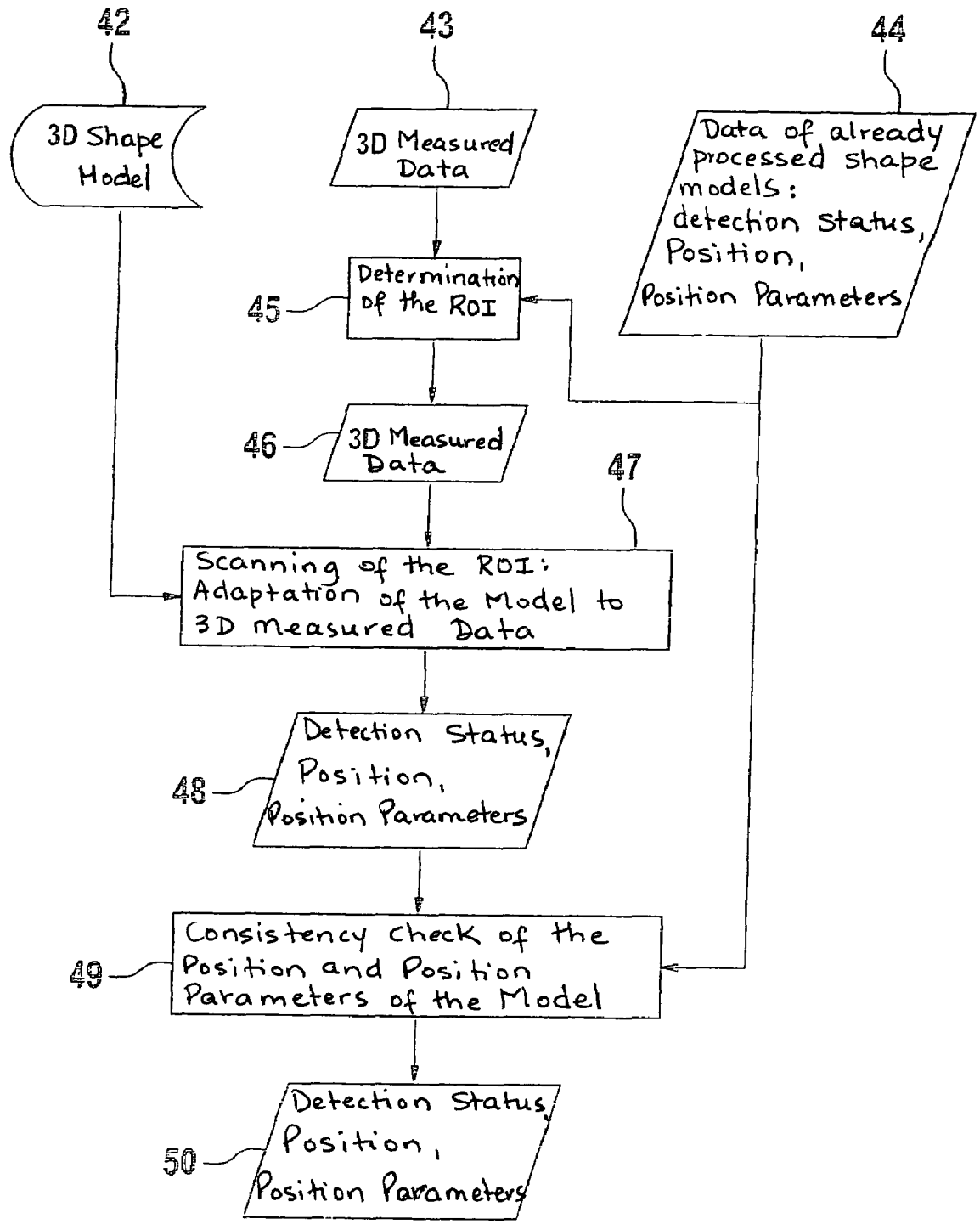
FIG. 6 is a second flow chart of an example embodiment of the method according to the present invention.

FIG. 6 shows a second flow chart of an example embodiment of the method according to the present invention. In method step 43, depth sensor 1 produces the spatial data. Method step 45 defines a region to be examined. This is done using data of already processed shape models: the detection status, position, and position parameters from method step 44. In method steps 46 and 47, the model is adapted to the spatial data, taking into account the spatial shape model from method step 42. This step may be carried out, for example, using a standard method of model adaptation in terms of the minimum square error.

If this adaptation was successful, then, in method step 48, the detection status is stored in terms of position and position parameters. In method step 49, the position and position parameters of the model are then checked for consistency. To this end, the data of already processed shape models from method step 44 is reused. In method step 50, the results of the adaptation are recorded in the detection status of the sub-model. The detection status and the position parameters are passed on to the next higher level. If, again, relationships exist with another model, then a consistency check is performed until the complete model has been assembled. Once the model has been adapted, a subsequent, complete adaptation is no longer needed, and the detected body parts can be tracked in space and time. For fast and stable implementation, only body parts that can be detected quickly and reliably should be included in the model, typically the head, torso, and arms. The head module and the upper part of the body play a central role in the model because the human head is of outstanding importance to the set objective and, in addition, is comparatively invariant in shape. Moreover, the head is usually spatially exposed, and can therefore be located relatively reliably. The presented method is generally independent of the source of the spatial data.

Figure 7A:
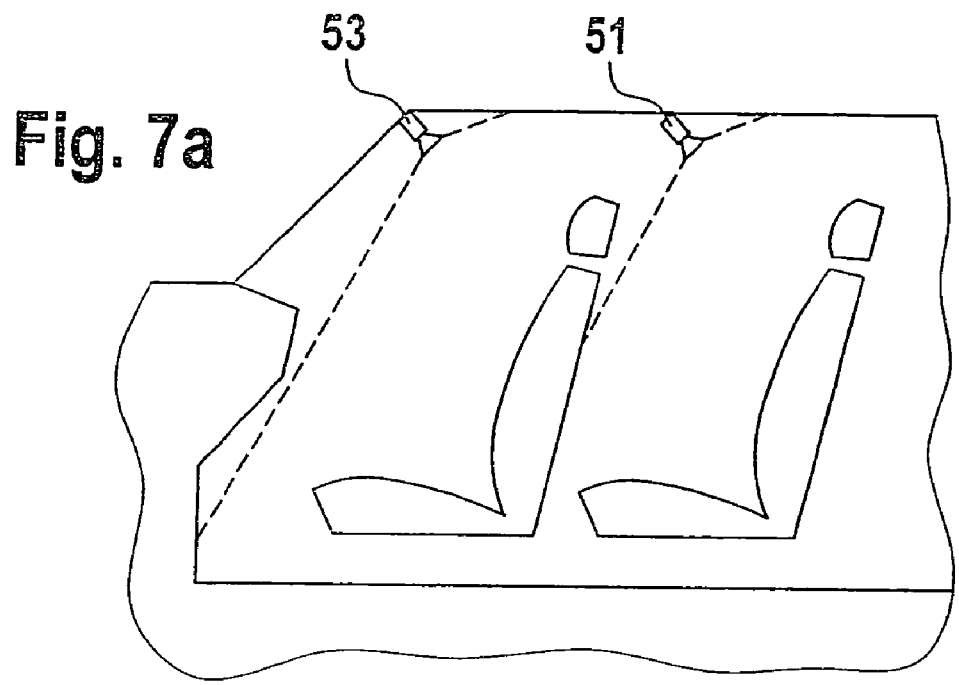
FIG. 7 shows different mounting positions to cover the rear passenger compartment, according to an example embodiment of the present invention.
Figure 7B:
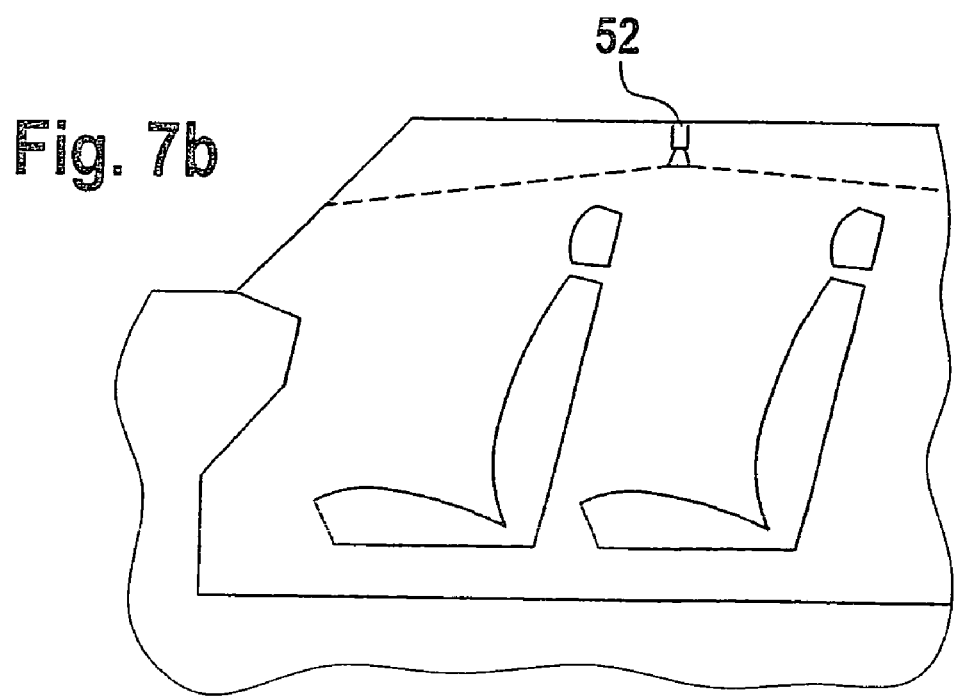

FIG. 7, image (a), shows an additional sensor for covering the rear passenger compartment, according to an example embodiment of the present invention. FIG. 7*b*, in contrast, shows an alternative mounting position of the sensor for covering the entire rear passenger compartment, according to an example embodiment of the present invention. This is denoted by reference numeral 52, whereas in FIG. 7*a*, sensor 53 is provided for the front seat and sensor 51 for the rear seat.

What is claimed is:

1. A method for detecting a person in a space, comprising:
producing spatial data about the space to be monitored via at least one depth sensor;
using at least one sub-model which is subdividable into further sub-models for at least one selected body part of a human, wherein the at least one sub-model is selected from a hierarchically-structured model data set including different sub-models for the at least one selected body part;
adapting the sub-models using the spatial data, wherein the adaptation is checked by position parameters between the sub-models of different body parts; and
recognizing the person using a complete model made up of checked sub-models.

2. The method of claim 1, wherein the complete model is adapted to track the persons over time by further adapting the sub-models using the data at predetermined intervals.

3. The method of claim 1, wherein the at least one selected body part is the head of a human.

4. The method of claim 1, wherein the at least one selected body part is the shoulder.

5. The method of claim 1, wherein intensity information from the spatial data is used.

6. The method of claim 1, wherein at least part of the complete model is transmitted for occupant classification to a restraint system in a vehicle in which a person is located.

7. The method of claim 1, wherein the complete model is used in an anti-pinch protection.

8. The method of claim 1, wherein the depth sensor has at least one image pickup.

9. The method of claim 8, wherein the at least one image pickup includes a video sensor.

10. The method of claim 1, further comprising:
controlling convenience features in a vehicle.

* * * * *